United States Patent
Furuta et al.

(10) Patent No.: US 6,670,042 B2
(45) Date of Patent: Dec. 30, 2003

(54) INSULATING FILM

(75) Inventors: Motonobu Furuta, Chiba (JP); Takanari Yamaguchi, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/073,421

(22) Filed: Feb. 13, 2002

(65) Prior Publication Data

US 2002/0128389 A1 Sep. 12, 2002

(30) Foreign Application Priority Data

Feb. 15, 2001 (JP) .................................... 2001-038115
Sep. 14, 2001 (JP) .................................... 2001-279519

(51) Int. Cl.⁷ ............................................. B32B 15/08
(52) U.S. Cl. ................... 428/418; 361/301.1; 361/323; 525/68; 525/132; 525/327.3; 525/396; 525/523; 525/534; 528/86; 528/87; 528/98
(58) Field of Search .................... 525/396, 68, 132, 525/327.3, 523, 534; 528/86, 87, 98; 361/301.1, 323; 428/418

(56) References Cited

U.S. PATENT DOCUMENTS

| | | |
|---|---|---|
| 4,454,284 A | 6/1984 | Ueno et al. |
| 5,385,976 A | 1/1995 | Furuta et al. |
| 5,559,184 A | 9/1996 | Furuta et al. |
| 5,625,000 A | 4/1997 | Furuta et al. |
| 5,834,565 A * | 11/1998 | Tracy ..................... 525/391 |

FOREIGN PATENT DOCUMENTS

| | | |
|---|---|---|
| JP | 5-243084 | 9/1993 |
| JP | 7-102169 | 4/1995 |

* cited by examiner

*Primary Examiner*—Robert Dawson
*Assistant Examiner*—D. Aylward
(74) *Attorney, Agent, or Firm*—Birch, Stewart, Kolasch & Birch, LLP

(57) ABSTRACT

Provided is an industrially advantageous insulating film obtainable from a resin composition comprising (A) 100 parts by weight of a polyphenylene oxide having a structural unit of the following formula (1):

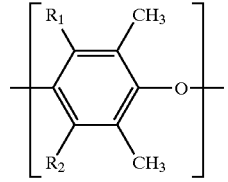

(1)

and (B) 0.1 to 60 parts by weight of a copolymer having a functional group reactive with the above-mentioned polyphenylene oxide.

9 Claims, No Drawings

INSULATING FILM

BACKGROUND OF THE INVENTION

1. Field of the Invention

The present invention relates to insulating film which is excellent in heat resistance and electric insulating property and cheap.

2. Description of the Related Art

What is called super engineering plastics such as polyether sulfone, polyether ether ketone, polyether imide, polyamideimide and the like are widely used industrially as an insulating film because of excellent heat resistance and electric insulating property. However, there are indicated various problems such as extreme high price, insufficient molding processability in some cases, poor flexibility and the like.

On the other hand, regarding polyphenylene oxides, it is known that a resin composition composed of a polyphenylene oxide and a copolymer of an olefin and glycidyl methacrylate and/or glycidyl acrylate shows excellent impact resistance (JP-A No. 57-108153), and it is known that a resin composition composed of an amine-modified polyphenylene oxide and a copolymer of an ethylene and an unsaturated glycidyl carboxylate or unsaturated glycidyl ether can be used for films such as a film, sheet and the like (JP-A No. 7-102169).

However, it is not known that a resin composition obtained by using an un-modified polyphenylene oxide can be used for electric insulating film.

SUMMARY OF THE INVENTION

The present inventors have intensively studied to find an insulating film which is excellent in heat resistance and electric insulating property and additionally is cheap, and resultantly found that the object is attained even by a resin composition obtained by using an un-modified polyphenylene oxide, leading to completion of the invention.

Namely, the present invention provides industrially advantageous insulating film obtained by using a resin composition comprising (A) 100 parts by weight of a polyphenylene oxide having a structural unit of the following formula (1):

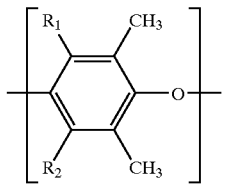

(1)

(wherein, $R_1$ and $R_2$ represent each independently hydrogen or a hydrocarbon group which may have a substituent and has 1 to 20 carbon atoms in total), and (B) 0.1 to 60 parts by weight of a copolymer having a functional group reactive with the above-mentioned polyphenylene oxide.

DETAILED DESCRIPTION OF THE INVENTION

The polyphenylene oxide which is a component (A) in the present invention has a structural unit of the above-mentioned formula (1), and this structural unit can be derived, for example, from at least one of phenol compounds of the following formula (2):

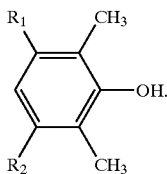

(2)

$R_1$ and $R_2$ represent each independently hydrogen or a hydrocarbon group which may have a substituent and has 1 to 20 carbon atoms in total, and examples of the hydrocarbon group include: alkyl groups having 1 to 20 carbon atoms in total such as a methyl group, ethyl group, n-propyl group, iso-propyl group, n-butyl group, iso-butyl group, t-butyl group, pentyl group, cyclopentyl group, hexyl group, cyclohexyl group, octyl group, decyl group and the like; aryl groups having 6 to 20 carbon atoms in total such as a phenyl group, 4-methylphenyl group, 1-naphthyl group, 2-naphthyl group and the like; aralkyl groups having 7 to 20 carbon atoms in total such as a benzyl group, 2-phenylethyl group, 1-phenylethyl group and the like; hydrocarbon groups having 1 to 20 carbon atoms in total having a substituent such as a trifluoromethyl group, 2-t-butyloxyethyl group, 3-diphenylaminopropyl group and the like.

Of them, $R_1$ and $R_2$ preferably represent hydrogen, methyl group and the like, and particularly, hydrogen is preferable.

The polyphenylene oxide which is a component (A) in the present invention may be a polymer of a phenol compound of the above-mentioned formula (2) or a copolymer of a phenol compound of the formula (2) with other phenol compounds, for example, poly-valent hydroxy aromatic compounds such as bisphenol-A, tetrabromobisphenol-A, resorcin, hydroquinone and novolak resins. In such copolymers, a structural unit of the formula (1) derived from the formula (2) is contained in an amount of preferably 80 mol % or more, more preferably 90 mol % or more.

The polyphenylene oxide which is a component (A) can be produced by oxidation-polymerizing the above-mentioned phenol compound with oxygen or oxygen-containing gas using an oxidation coupling catalyst. The oxidation coupling catalyst is not particularly restricted, and any catalyst having a polymerization ability can be used. For example, listed as typical examples thereof are catalysts containing cuprous chloride and catalysts containing di-valent manganese salts.

The component (A) in the present invention has an intrinsic viscosity [η] of preferably from 0.30 to 0.65, further preferably from 0.35 to 0.50 (25° C., chloroform solution). When [η] is less than 0.30, the heat resistance of a composition tends to decrease, and when over 0.65, the molding processability of a composition tends to lower, undesirably.

As the polyphenylene oxide, unmodified commercially available polyphenylene oxides are preferably used. Modification of these polymers is not preferred, because the reactive reagent for modification may react with the component (B) during the compounding process to cause uncontrolled reaction and produce fish eyes in the film made from the composition.

The insulating film of the present invention are obtained by using a resin composition composed of the above-mentioned component (A), polyphenylene oxide and the component (B), copolymer having a functional group reactive with the polyphenylene oxide, and the functional group reactive with the polyphenylene oxide may be permissible if it has reactivity with the component (A), and examples thereof include and oxazolyl group, epoxy group, amino group and the like. An epoxyl group is preferable. An epoxyl group and the like may exist also as a part of other functional groups, and a glycidyl group is mentioned as an example thereof.

In the copolymer which is component (B), as a method of introducing such a functional group into a copolymer, it is not limited especially and can be carry out by the well-known methods. For example, it is possible to introduce a monomer having this functional group by copolymerization in a preparation stage of the copolymer. It is also possible to conduct a graft copolymerization of a monomer having this functional group to a copolymer.

As the monomer having the functional group, a monomer containing a glycidyl group is used suitably. As the monomer containing a glycidyl group, unsaturated glycidyl carboxylate and unsaturated glycidyl ether represented by the following formula are preferably used,

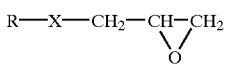

In the formula, R is a hydrocarbon group of 2–18 carbons having an ethylenically unsaturated bond, and X is a group represented by —C(O)O—, —CH$_2$—O— or

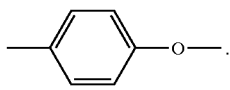

As the unsaturated glycidyl carboxylate, exemplified are, for example: glycidyl acrylate, glycidyl methacrylate, itaconic acid diglycidyl ester, butene tricarboxylic acid triglycidyl ester, p-styrene glycidyl carboxylate, etc.

As the unsaturated glycidyl ether, exemplified are, for example: vinyl glycidyl ether, allyl glycidyl ether, 2-methyl allyl glycidyl ether, methacryl glycidyl ether, styrene-p-glycidyl ether, etc.

The copolymer (B) having a functional group reactive with polyphenylene oxide desirably contains 0.1 to 20% by weight of a unsaturated glycidyl carboxylate unit and/or unsaturated glycidyl ether unit.

Moreover, in order to improve the heat stability and flexibility of the molded products by using the resin composition of the present invention, the heat of fusion of the crystal in the copolymer (B) is suitably less than 3 J/g. And the Mooney viscosity is suitably 3 to 70, more suitably 3 to 30, and especially suitably 4 to 25. Here, Mooney viscosity means the value measured using a large rotor at 100° C. according to JIS K6300.

The copolymer (B) having a functional group reactive with polyphenylene oxide may be a rubber, a thermoplastic resin, or a mixture thereof.

As a method of introducing such a functional group into a rubber, it is not limited especially and can be carry out by the well-known methods. For example, it is possible to introduce a monomer having the functional group by copolymerization in a preparation stage of the rubber. It is also possible to conduct a graft copolymerization of a monomer having the functional group to a rubber.

Examples of the epoxy-group containing rubber as the copolymer (B) having a functional group reactive with polyphenylene oxide include a copolymer rubber of (meth) acrylate-ethylene-(unsaturated glycidylcarboxylate and/or unsaturated glycidylether), and the like. Here, the above (meth)acrylate is an ester obtained from an acrylic acid or methacrylic acid and an alcohol. As the alcohol, an alcohol having 1–8 carbons is preferable. Concrete examples of the (meth)acrylates include methyl acrylate, methyl methacrylate, n-butyl acrylate, n-butyl methacrylate, tert-butyl acrylate, tert-butyl methacrylate, 2-ethylhexyl acrylate, 2-ethylhexyl methacrylate, etc. The (meth) acrylates can be used alone or as a mixture of two or more therof.

In order to improve the heat stability and mechanical physical properties of the copolymer rubber in the present invention: (meth)acrylate is more than 40% by weight and less than 96% by weight, preferably 45 to 75% by weight; ethylene unit is 3% by weight or more and less than 50% by weight, preferably 10 to 90% by weight; and unsaturated glycidyl carboxylate unit and/or unsaturated glycidyl ether unit is 0.1% to 30% by weight, preferably 0.1 to 20% by weight.

The copolymer rubber can be prepared by usual methods, for example, bulk polymerization, emulsion polymerization, solution polymerization, etc. using a free radical initiator. Typical polymerization methods are those described in JP-B-46-45085, JP-B-61-127709, etc., and it can be prepared under the existence of a polymerization initiator which generates a free radical, at the pressure of more than 500 kg/cm$^2$, and the temperature of 40–300° C.

Examples of other rubbers which can be used as component (B) of the present invention include, an acryl rubber having a functional group reactive with a polyphenylene oxide, and a block copolymer rubber of vinyl aromatic hydrocarbon compound-conjugated diene compound having a functional group reactive with a polyphenylene oxide.

The acryl rubber here is suitably those having at least one monomer as a component selected from the compounds represented by the general formulas (3) to (5).

$$CH_2=CH—C(O)—OR^1 \quad (3)$$

$$CH_2=CH—C(O)—OR^2OR^3 \quad (4)$$

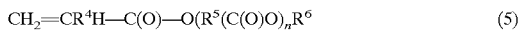

$$CH_2=CR^4H—C(O)—O(R^5(C(O)O)_nR^6 \quad (5)$$

In the formula, R$^1$ is an alkyl group having 1–18 carbon atoms or a cyano alkyl group having 1–18 carbon atoms. R$^2$ is an alkylene group having 1–12 carbon atoms, R$^3$ is an alkyl group having 1–12 carbon atoms. R$^4$ is a hydrogen atom or methyl group, R$^5$ is an alkylene group having 3–30 carbon atoms, R$^6$ is an alkyl group having 1–20 carbon atoms or derivative thereof, and n is an integer of 1–20.

Examples of the alkyl acrylate represented by the above general formula (3) include methyl acrylate, ethyl acrylate, propyl acrylate, butyl acrylate, pentyl acrylate, hexyl acrylate, octyl acrylate, 2-ethylhexyl acrylate, nonyl acrylate, decyl acrylate, dodecyl acrylate, cyanoethyl acrylate, etc.

Examples of the alkoxyalkyl acrylate represented by the above general formula (4) include, methoxy ethyl acrylate, ethoxy ethyl acrylate, ethoxy propyl acrylate, etc. These compounds can be used alone or in combination of two or more, as a component of the acryl rubber.

As a composition component of the acryl rubber, an unsaturated monomer which can be copolymerized with at least one selected from the compounds represented by the above general formulas (3)–(4) can be used, according to requirements.

Examples of such unsaturated monomers include styrene, α-methyl styrene, acrylonitrile, halogenated styrene, methacrylonitrile, acryl amide, methacryl amide, vinyl naphthalene, N-methylol acrylamide, vinyl acetate, vinyl chloride, vinylidene chloride, benzyl acrylate, methacrylic acid, itaconic acid, fumaric acid, maleic acid, etc.

The suitable component ratio of the acryl rubber reactive with a polyphenylene oxide is: 40.0 to 99.9% by weight of at least one monomer selected from the compounds represented by the above formulas (3) to (5); 0.1 to 30% by weight, preferably 0.1 to 20% by weight of unsaturated glycidyl carboxylate and/or unsaturated glycidyl ether; 0.0 to 30% by weight of one monomer which can be copolymerized with at least one of the unsaturated monomers selected from the compound represented by the above general formulas (3) to (5).

When the component ratio of the acryl rubber is within the above range, the composition has excellent heat resistance, impact resistance and molding processability, and it is preferable.

The preparation process of the acryl rubber is not especially limited, and well known polymerization method described, for example, in JP-A-59-113010, JP-A-62-64809, JP-A-3-160008, or WO 95/04764 can be used. It can be prepared under the existence of a radical initiator, by emulsion polymerization, suspension polymerization, solution polymerization, or the bulk polymerization.

Examples the block copolymer rubber of vinyl aromatic hydrocarbon compound-conjugated diene compound include: a rubber which is obtained by epoxidization of a block copolymer comprising sequences mainly consisting of vinyl aromatic hydrocarbon compound, and sequences mainly consisting of conjugated diene compound; or a rubber which is obtained by epoxidization of a hydrogenated product of said block copolymer.

Examples of the aromatic hydrocarbon compound include styrene, vinyltoluene, divinylbenzene, α-methyl styrene, p-methyl styrene, vinyl naphthalene, etc. Among them, styrene is suitable. Examples of the conjugated diene compound include, for example, butadiene, isoprene, pyrelylene, 1,3-pentadiene, 3-butyl-1,3-octadiene, etc. Butadiene and isoprene are suitable.

The block copolymer of vinyl aromatic hydrocarbon compound-conjugated diene compound or the hydrogenated product thereof can be prepared by the well-known methods, for example, as described in JP-B-40-23798, JP-A-59-133203, etc.

A rubber used as copolymer (B) may be vulcanized according to requirements, and it can be used as a vulcanized rubber. Vulcanization of the above copolymer rubber of (meth)acrylate-ethylene-(unsaturated glycidylcarboxylate and/or unsaturated glycidylether) is attained by using a polyfunctional organic carboxylic acid, a polyfunctional amine compound, an imidazole compound, etc., without being limited thereto.

On the other hand, specific examples of epoxy group-containing thermoplastic resin as the copolymer having a functional group reactive with polyphenylene oxide, include an epoxy group-containing ethylene copolymer comprising (a) 60 to 99% by weight of an ethylene unit, (b) 0.1 to 20% by weight of unsaturated glycidyl carboxylate unit and/or unsaturated glycidyl ether unit, and (c) 0 to 40% by weight of an ethylene-based unsaturated ester compound unit.

Examples of the ethylenically unsaturated ester compound (c) include vinyl ester of carboxylic acid and alkyl ester of α,β-unsaturated carboxylic acid, etc. such as: vinyl acetate, vinyl propionate, methyl acrylate, ethyl acrylate, butyl acrylate, methyl methacrylate, ethyl methacrylate, and butyl methacrylate. Vinyl acetate, methyl acrylate and ethyl acrylate are especially preferable.

Examples of the epoxy group containing ethylene copolymer include, a copolymer comprising ethylene unit and glycidyl methacrylate unit, a copolymer comprising ethylene unit, glycidyl methacrylate unit and methyl acrylate unit, a copolymer comprising ethylene unit, glycidyl methacrylate unit and ethyl acrylate unit, and a copolymer comprising ethylene unit, glycidyl methacrylate unit and vinyl acetate unit etc.

Melt index (hereinafter referred to as MFR. JIS K6760, at 190° C., 2.16 kg load) of the epoxy group containing ethylene copolymer is suitably 0.5 to 100 g/10 minutes, more preferably 2 to 50 g/10 minutes. Although melt index may be outside this range, when the melt index is more than 100 g/10 minutes, it is not preferable in respect to mechanical physical properties of the composition. When the melt index is less than 0.5 g/10 minutes, compatibility with component (A) is inferior and it is not preferable.

The epoxy group containing ethylene copolymer, has suitably a bending shear modulus of 10 to 1300 kg/cm2, more suitably 20 to 1100 kg/cm$^2$.

When the bending shear modulus is outside the above range, molding processability and mechanical physical properties of the composition may become inferior, and it is not preferable.

The epoxy group containing ethylene copolymer is manufactured by high pressure radical polymerization method of copolymerizing usually an unsaturated epoxy compound and ethylene, under existence of a radical generating agent, at a pressure of 500 to 4000 atm and at 100–300° C., under existence or un-existing of a suitable solvent and a chain transfer agent. It is manufactured also by a method of conducting molten graft copolymerization in an extruder, mixing an unsaturated epoxy compound and a radical generating agent with polyethylene.

The resin composition in the present invention comprises (A) 100 parts by weight of component (A) and 0.1 to 60, preferably 1 to 50 parts by weight of component (B).

Especially, a resin composition containing the component (A) as a continuous phase and the component (B) as a disperse phase is preferable.

When component (A) is less than 0.1 parts by weight, mold processing property of the film may become inferior, and it is not preferable. When component (A) is more than 60 parts by weight, heat resistance of the composition may become inferior, and it is not preferable.

In the resin composition of the present invention, it is believed that reactions occur between component (A) and component (B) of the composition, although detail of the mechanism is not clear, consequently, the molding property of the composition is improved and films obtained by using this composition are excellent.

For preparation of the resin composition of the present invention, a method, in which components of the composition are mixed in solution condition and a solvent is evaporated or the components are precipitated in a solvent is exemplified. A method of melt-kneading the components in molten state is exemplified as well. From the industrial viewpoint, a method of kneading components in molten state is preferable.

For mixing the components in solution, it is preferable to select a good solvent for both of component (A) and component (B). Examples of the solvent include o-dichlorobenzene, anisole, toluene, and the like.

In order to dissolve the each component in a solvent, it may be possible to use the solvent with heating. In the case, the solvent is removed from the solution to obtain the composition of the present invention. In order to obtain the composition of the present invention by melt-kneading, generally used kneading apparatuses such as single-screw or twin-screw extruders, various kneaders and the like can be used. Particularly, a twin-screw high kneader is preferable.

In kneading, components may also be uniformly mixed previously by an apparatus such as a tumbler mixer or a Henschel mixer, and if necessary, a method in which mixing is omitted and components are separately fed in quantitative amounts respectively into a kneading apparatus may also be used.

Further, various additives such as organic fillers, heat stabilizers, optical stabilizers, flame retardants, lubricants, inorganic or organic coloring agents, cross-linking agents, foaming agents, fluorescents, surface smoothing agents, surface gloss improving agents, releasing improving agents like a fluorine resin, and the like can also be added during a production process or in the subsequent working process, if necessary.

The insulating film in the present invention can be produced as a film or sheet, having a thickness suitably about 1 $\mu$m to 2 mm, more suitably 2 $\mu$m to 500 $\mu$m and further suitably 3 $\mu$m to 200 $\mu$m, by applying known molding methods such as a solution cast method, T-die extrusion method, inflation film formation method, heat press method and the like. The solution cast method is preferably used to obtain a film having a thickness of less than 10 $\mu$m.

As the solution cast method, methods are listed in which a solution of a resin composition is flown on a glass plate and the like and a solvent is removed by drying or this solution is flown on the surface of liquid such as water, mercury and the like and a solvent is removed, as the T-die extrusion method, methods are listed in which a molten resin composition is extruded from a T-die and wound, as the inflation film formation method, methods are listed in which a molten resin composition is extruded into a cylindrical form from an extruder equipped with an annular die, and cooled and wound, and the heat press method, methods are listed in which a resin composition is molded at high temperature under pressure.

Surface treatment can be performed, if necessary, on the surface of the resulting film. As such a surface treatment method, for example, corona discharge treatment, plasma treatment, flame treatment, infrared ray treatment, sputtering treatment, solvent treatment, polishing treatment and the like are listed.

Thus obtained film of the present invention can be widely used in industrial fields such as electric and electronic materials, construction materials, OA materials and the like as an insulating film and sheet, since they are excellent in heat resistance, have excellent electric insulating property, show low dielectric constant and dielectric loss tangent, and additionally, are cheap. For example, the film can be used in film condensers, IC cards, magnetic cards, wall paper, curtains, labels, stickers and the like.

Of them, the film of the present invention is particularly useful as an insulating resin film in a film condenser.

Here, the film condenser is widely used in fields such as electronic instruments of ships, airplanes, space equipments, vehicles and the like, radio communication, typically including television, radio and sound instruments, or, driving of a small motor of electric apparatuses, fluorescent light, mercury light and the like, and in general, produced by using a plastic film as a dielectric substance, using a metal foil and metal deposited film as an electrode, and superposing and winding them.

However, the plastic films conventionally used as a dielectric substance are polyolefins such as polyethylene and polypropylene, polyesters such as polyethylene terephthalate, fluorine resins, polycarbonates and the like, and conventional film condensers do not sufficiently satisfy commercial needs, under current conditions.

For example, when a polyolefin is used as a dielectric substance, heat resistance is insufficient and soldering cannot be conducted. Also when a polyester is used, heat resistance is insufficient and, water absorption is high, consequently causing a problem of deformation of a film under high humidity. When polyethylene tetrafluoride is used, problems such as high specific gravity, extreme high cost, generation of a fluorine-containing gas in incineration after use, and the like are indicated. Further, when also a polycarbonate and polystyrene are used, heat resistance is insufficient.

Contrastively, a film condenser using the insulating film of the present invention is excellent in heat resistance, high frequency property, electric insulating property and the like, has low dielectric constant, and additionally, is cheap.

When the insulating film of the present invention is used in a film condenser, conventionally used metal foils and metal deposited films can be used as an electrode.

Examples of such metal foils include a copper foil, gold foil, aluminum foil, stainless foil, tin foil or, alloy foils such as nickel-chromium, copper-nickel and the like. Of them, a copper foil, gold foil, tin foil and aluminum foil are preferable. As the copper foil, any of a rolled copper foil and electrolyzed copper film can be used.

As the metal deposited film, metal deposited film excellent in electric conductivity can be selected appropriately depending on the object. Examples of such metal deposited film include deposited films of copper, aluminum, gold, silver, tin, stainless, or alloys such as nickel-chromium. Of them, deposited films of copper, gold and aluminum are preferable. The electrode may also be a laminate of a metal deposited film and a metal foil.

The form of a film condenser is not particularly restricted, and there are listed, for example, a tab form having a structure in which a metal foil and an insulating film in the present invention are superposed alternately, a lead line is welded at approximately half position along the longitudinal direction of the metal foil and connected by soldering or crimping and wound, an extend foil form having a structure in which a metal foil is shifted to left and right along the width direction of an insulating film to make extrusion from the insulating film and wound, then, the end of a lead line is connected to the surface by soldering and the like, a lamination form in which an insulating film and a metal foil are cut into a constant size without winding and laminated, and a lead line is fitted by performing metallicon, and the like. Further, an adhesive layer can be allowed to exist between constituent components such as a film of the present invention, metal foils and the like. As such an adhesive, a dry lamination adhesive, melt extrusion adhesive or resins and the like can be used depending on the object.

The insulating film of the present invention laminated with a metal foil or, laminated in the form of metal foil/insulating film/polyimide, and can also be used as flexible cable.

EXAMPLES

The following examples illustrate the present invention but do not limit the scope of the invention.
(1) Measurement of Physical Properties
(i) Heat Analysis Heat analysis was conducted by using EXSTAR DSC6200 type manufactured by Seiko Instrument, Inc., under a nitrogen atmosphere, at a temperature rising rate of 10° C./min., in measurement range from 23 to 300° C. and at a temperature decreasing rate of 10° C./min.
(ii) Volume Resistivity Volume resistivity was measured according to ASTM D257 at a measurement temperature of 23° C., a humidity of 50% RH, and an application voltage of 100V×1 min.
(iii) Dielectric Constant, Dielectric Loss Tangent Dielectric constant, and dielectric loss tangent were measured according to ASTM D150 at a humidity of 50% RH, a measurement temperature of 23° C., and a frequency of 1 KHz.
(2) Composition
Component (A)

As the component (A), poly(2,6-dimethyl-1,4-phenylene oxide) (YPX-100F ([η]=0.4)) manufactured by Mitsubishi Gas Chemical Co., Inc. was used.
Component (B)

As the component (B), Bond Fast 7L (ethylene/glycidyl methacrylate/methyl acrylate=67/3/30 (weight ratio), MFR (190° C.)=10 g/10 min.) manufactured by Sumitomo Chemical Co., Ltd. was used.

Example 1

The above-mentioned component (A) and component (B) were mixed well at a ratio of component (A)/component (B) of 80/20 (weight ratio), then, placed into a small extruder, Minimax·Mixtruder manufactured by Toyo Seiki Seisakusho K.K. set at a temperature of 280° C. and a revolution of 100 rpm, and the mixture was melt-kneaded.

5 g of thus obtained composition was charged into a flask together with 100 cc of o-dichlorobenzene, and this flask was heated for 4 hours at a temperature of 180° C. After completion of heating, the liquid in the flask was flown on a glass plate, this was evacuated at 70° C. for 6 hours to remove the solvent, then, peeled off from the glass plate to obtain a film of the composition.

The resulting film had a thickness of 35 μm and had flexibility, and neither weal nor wrinkle was found on the surface, the whole film manifested slight pale brown hue and no irregular color, showing excellent appearance.

Heat analysis of the film was conducted to show a glass transition temperature of 195° C.

Further, this film was pressed for 2 minutes at a temperature of 270° C. and a pressure of 10 MPa using a heat press to form a sheet, and the electric properties thereof were measured. The volume resistivity was $11.8 \times 10^{15}$, the dielectric constant at a frequency of 1 KHz was 2.7, and the dielectric loss tangent was 0.001.

Comparative Example 1

Melt kneading was conducted in the same manner as in Example 1 except that the component (B) was not used, then, film formation was tried in the same manner as in Example 1, however, only a film which was extremely fragile and had poor appearance could be obtained.

According to the present invention, insulating film which is excellent in heat resistance and electric insulating property and the like, and additionally, are cheap can be provided. The insulating film of the present invention is particularly useful as insulating resin film for a film condenser.

What is claimed is:
1. Insulating film obtained by using a resin composition comprising:

(A) 100 parts by weight of a polyphenylene oxide having a structural unit of the following formula (1):

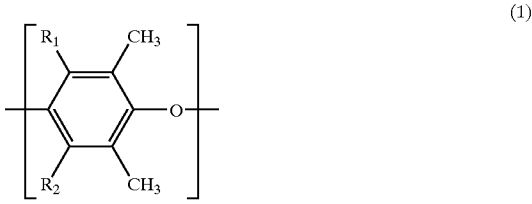

wherein, $R_1$ and $R_2$ represent each independently hydrogen or a hydrocarbon group which may have a substituent and has 1 to 20 carbon atoms in total, and (B) 0.1 to 60 parts by weight of a copolymer having a functional group reactive with said polyphenylene oxide, wherein the copolymer (B) has heat of fusion of less than 3 J/g.

2. The insulating film according to claim 1 wherein the functional group in the copolymer (B) is an epoxy group.

3. The insulating film according to claim 1 or 2 wherein the copolymer (B) is a copolymer containing 0.1 to 30% by weight of a unsaturated glycidyl carboxylate unit and/or unsaturated glycidyl ether unit.

4. The insulating film according to claim 1 wherein the copolymer (B) has a Mooney viscosity of from 3 to 70, Mooney viscosity herein referred to is a value measured by using a large rotor at 100° C. according to JIS K6300.

5. The insulating film according to claim 1 wherein the copolymer (B) is a rubber having an epoxy group.

6. The insulating film according to claim 5 wherein the rubber having an epoxy group is composed of (meth) acrylate-ethylene- (unsaturated glycidyl carbxoylate and/or unsaturated glycidyl ether) copolymer rubber.

7. The insulating film according to claim 6 wherein the (meth)acrylate includes at least one selected from methyl acrylate, methyl methacrylate, n-butyl acrylate, n-butyl methacrylate, tert-butyl acrylate, tert-butyl methacrylate, 2-ethylhexyl acrylate and 2-ethylhexyl methacrylate.

8. The insulating film according to claim 1 wherein the copolymer (B) is an epoxy group-containing ethylene copolymer comprising (a) 60 to 99% by weight of an ethylene unit, (b) 0.1 to 20% by weight of unsaturated glycidyl carboxylate unit and/or unsaturated glycidyl ether unit, and (c) 0 to 40% by weight of an ethylene-based unsaturated ester compound unit.

9. A film condenser obtained by using the insulating film according to claim 1.

* * * * *